United States Patent [19]

Phillips

[11] Patent Number: 5,031,205
[45] Date of Patent: Jul. 9, 1991

[54] AUTO RESPONSE PHONE SYSTEM

[76] Inventor: Stephen Phillips, 18 Garner La., Bayshore, N.Y. 11706

[21] Appl. No.: 513,097

[22] Filed: Apr. 23, 1990

[51] Int. Cl.⁵ .................. H04M 1/64; H04M 1/66
[52] U.S. Cl. ............................. 379/88; 379/199; 379/373; 379/442
[58] Field of Search ............. 379/88, 51, 52, 199, 379/442, 373, 386

[56] References Cited

U.S. PATENT DOCUMENTS

| | | | |
|---|---|---|---|
| 3,784,721 | 1/1974 | Kilby | 379/74 |
| 3,793,487 | 2/1974 | Kilby | 379/74 |
| 4,255,618 | 3/1981 | Danner et al. | 381/77 |
| 4,518,827 | 5/1985 | Sagara | 379/88 |
| 4,697,282 | 9/1987 | Winter et al. | 379/67 |
| 4,734,930 | 3/1988 | Quiros et al. | 379/88 |
| 4,776,002 | 10/1988 | Kammerl | 379/88 |
| 4,813,014 | 3/1989 | DeBell | 365/45 |
| 4,827,501 | 5/1989 | Hansen | 379/199 |
| 4,881,205 | 11/1989 | Aihara | 365/222 |
| 4,893,329 | 1/1990 | O'Brien | 379/88 |
| 4,908,845 | 3/1990 | Little | 379/51 |

OTHER PUBLICATIONS

"Claudivs Converse", British Telecommunications Engineering, vol. 4, Jul. 1985, p. 116.

Primary Examiner—Thomas W. Brown
Attorney, Agent, or Firm—Collard, Roe & Galgano

[57] ABSTRACT

An auto response phone system is provided that allows a user to automatically screen calls and respond without even talking into a telephone receiver. In one embodiment of the invention the system is built into a conventional telephone. In an alternative embodiment the system is built into a separate case and operates as an accessory. The system stores several messages in non-volatile electronic format. The user picks up the phone when called to identify the caller. The user can then speak to the caller or automatically send one of the pre-recorded messages. A special night button automatically gives a night time message and disables the telephone ringer. If the caller sends a predetermined sequence of touch tones the user's ringer is re-activated to permit emergency calls to be answered. A monitor capability allows the user to monitor all telephone transactions.

13 Claims, 2 Drawing Sheets

AUTO RESPONSE PHONE SYSTEM

BACKGROUND OF THE INVENTION

The instant invention relates generally to the field of telecommunications and, more specifically to telephones and telephone accessories that limit access to a called telephone under certain conditions.

At the present state-of-the-art the telephone owner is subject to all sorts of unwanted telephone calls. Some of these undesired calls are placed by telephone solicitors, political campaign supporters, and charities. Some calls are merely annoyances and some may include harassment such as calls from bill collectors, ex-spouses, attorneys, children making prank calls, etc.

There is no way, at present to eliminate these calls or to ameliorate the extent to which they are annoying. Individuals have developed strategies to cope with this including hanging up immediately on unsolicited calls, explaining to the caller why the call is unwelcome, and threatening the caller. Legislative action is pending that may limit the use of, for instance, automated telephone soliciting. On occasion it is possible to have ones name removed from a solicitation list, but this is difficult at best.

Another problem is that of callers, sometimes desired callers, placing calls at inconvenient times. While leaving the phone off the hook entirely clearly prevents access during these times, it also prevents legitimate access in true emergencies.

A better solution would be to use some type of automated response system that provides appropriate responses for each of these situations.

SUMMARY OF THE INVENTION

It is, therefore, a primary object of the instant invention to provide an auto response phone system that allows the user to automatically respond to phone calls without actually speaking into the telephone.

Another object is to provide an auto response phone system that permits the user to monitor the incoming calls.

Yet another object is to provide an auto response phone system that stores a number of messages in non-volatile form.

A further object is to provide an auto response phone system equipped with a night switch that when depressed disables a telephone's ringer, announces that the user is asleep or away from the phone, and suggests calling in the morning, or entering some predetermined touch tone sequence to re-activate the ringer in case of emergency.

A yet further object is to provide an auto response phone system that can be built into the same form factor as a conventional telephone.

A still further object is to provide an auto response phone system that uses solid-state storage of message instead of tape for prolonged life, reduced size, and increased reliability.

Yet another object is to provide an auto response phone system that can be used as an accessory to an existing conventional telephone.

Another object is to provide an auto response phone system that is simple and inexpensive to fabricate and easy to use.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows.

LIST OF REFERENCE NUMERALS

10—the system integrated into a conventional telephone
12—SPST push button "RECORD" switch
14—SPST push button "MESSAGE 1" switch
16—microphone
18—microphone preamplifier integrated circuit
20—the system as a separate accessory
22—analog to digital converter integrated circuit
24—digital switch, discrete ICs or custom ASIC
26—electrically erasable programmable read only memory
28—electrically erasable programmable read only memory
30—SPST push button "MESSAGE 2" switch
32—electrically erasable programmable read only memory
34—SPST push button "NIGHT" switch
36—indicator lamp
38—read/write data line
40—read/write data line
42—read/write data line
44—erase control line
46—erase control line
48—erase control line
50—digital to analog converter integrated circuit
52—audio preamplifier integrated circuit
54—internal telephone line
56—mixer/multiplexer integrated circuit
58—SPST push button "MONITOR" switch
60—audio power amplifier integrated circuit
62—speaker
64—ring detector integrated circuit
66—electronic ring detector integrated circuit
68—tone detector integrated circuit
70—case for system integrated into telephone
72—conventional touch tone pad
74—case for system as accessory
76—modular telephone jack
78—external telephone cord
80—modular telephone plug

DETAILED DESCRIPTION OF THE PREFERRED EMBODIMENTS

Figure 1:
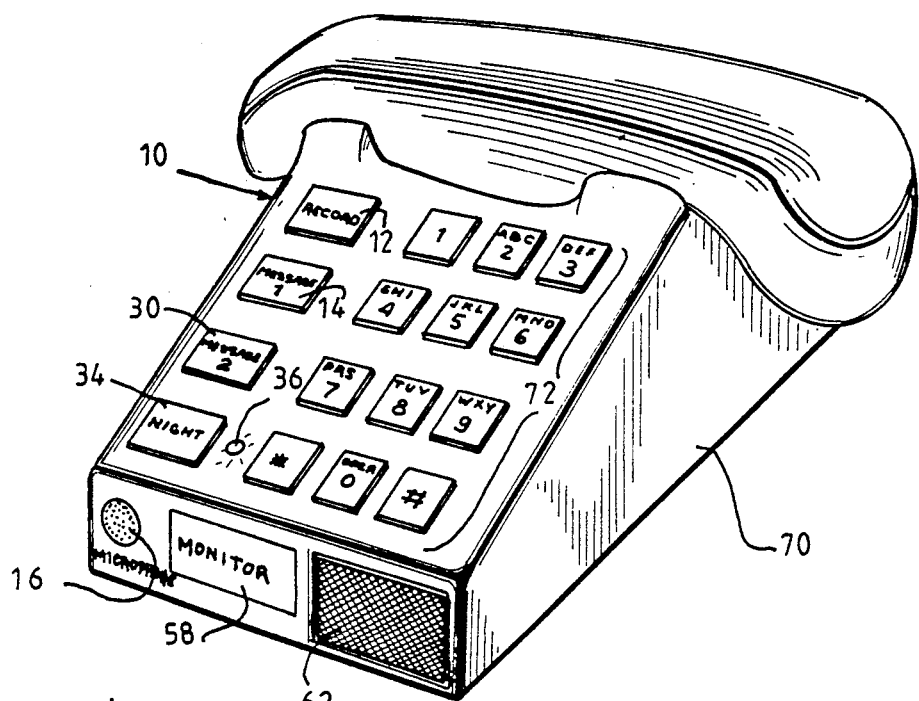
FIG. 1 is a perspective view of the invention shown built into a conventional telephone.
Figure 2:
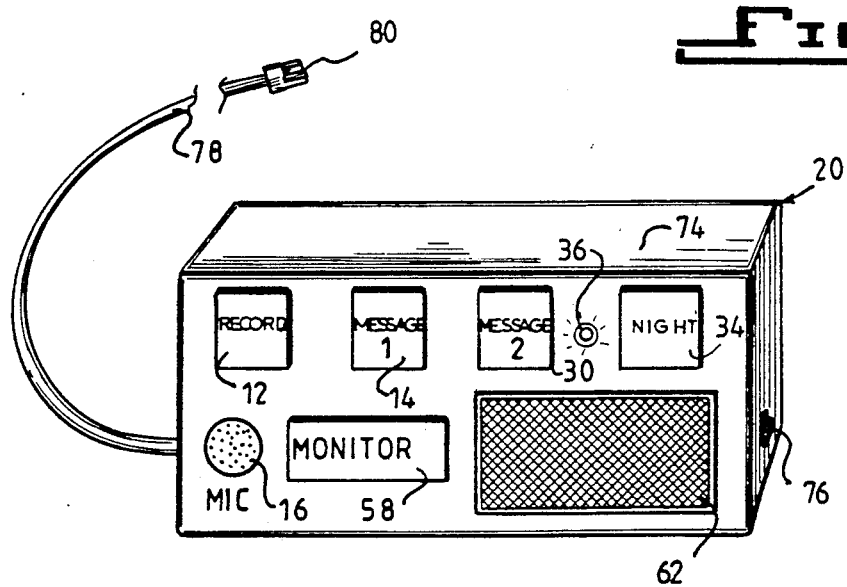
FIG. 2 is a perspective view of an alternative embodiment of the invention illustrated as an accessory that easily attaches to a conventional telephone.
Figure 3:
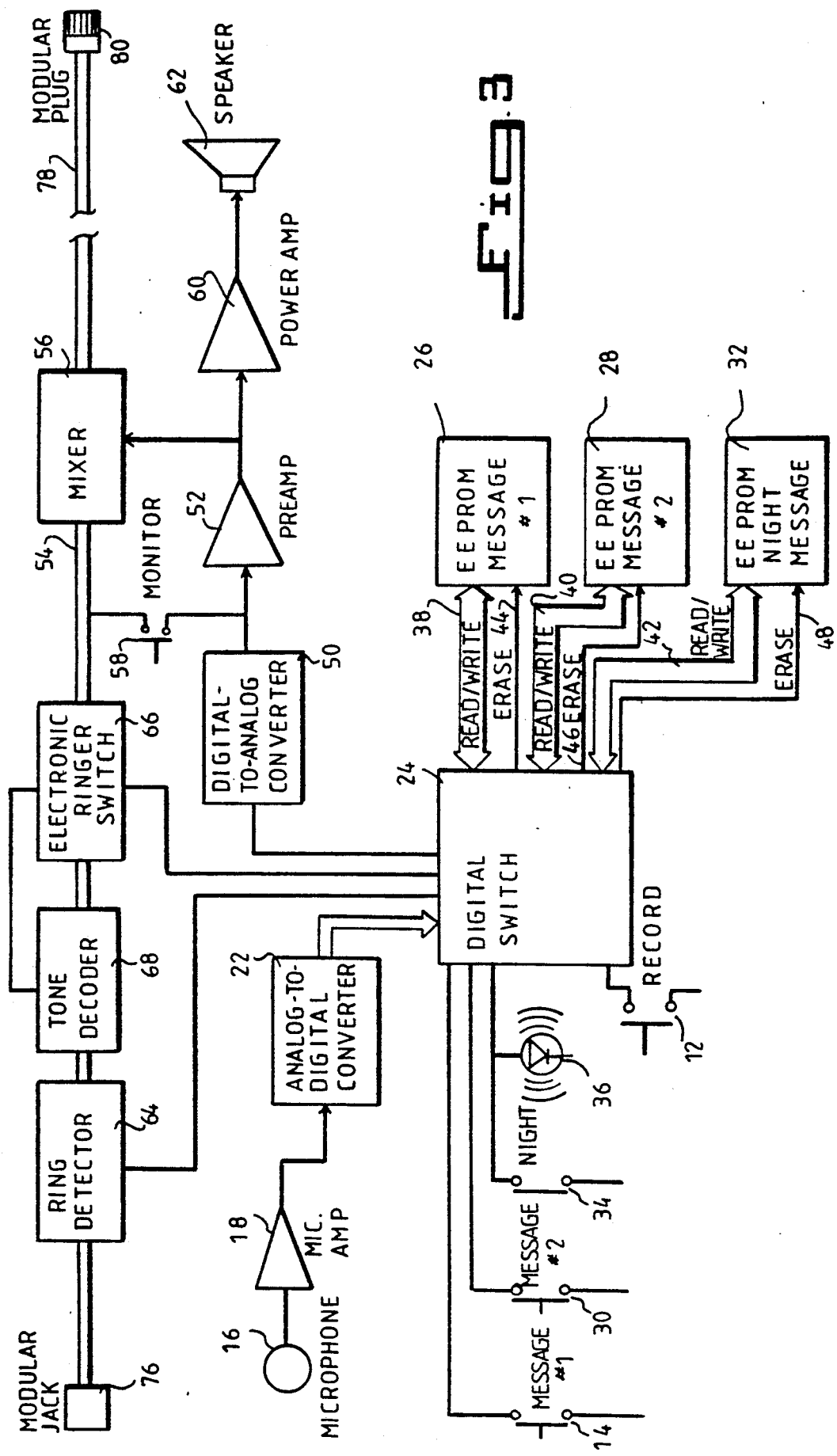
FIG. 3 is an electronic block diagram of the invention.

In FIG. 1 the auto response system 10 is shown integrated into a conventional telephone. In FIG. 2 the auto response system 20 is shown as an accessory that can be used with a conventional telephone.

The operation of either embodiment of the invention can best be understood with reference to all of the drawing figures, although the operation of both embodiments is essentially the same.

To prepare the auto response phone system for use messages must first be recorded To record message #1 the user depresses "RECORD" button 14 and "MESSAGE 1" button 12 simultaneously and begins speaking into microphone 16. The analog signal from microphone 16 is amplified by microphone preamplifier 18 and is converted to a string of digital signals by analog to digital converter 22. This digital output is routed via digital switch 24 to electrically erasable programmable read only memory (EEPROM #1) 26. Digital switch 24 is a custom logic circuit that may be implemented using discrete function integrated circuits or may be built as an application specific integrated circuit. The EEPROM #1 memory 26 is non-volatile and will not lose the message even if there is a loss of power.

Similarly, a second message can be stored in electrically erasable programmable read only memory (EEPROM #2) 28 by depressing "RECORD" button 14 and "MESSAGE 2" button 30 simultaneously. In a similar manner, any number of additional messages can be stored in read only memory (EEPROM #2) 28 simply by adding buttons similar to button 30. Also, pre-recorded messages may be recorded by the manufacturer, i.e. "I am sorry but this exchange does not accept telephone solicitations. Please send your request in writing" can be programmed into read only memory (EEPROM #2) 28 in a memory region that cannot be written to by the user. Likewise, a night message can be stored in electrically erasable programmable read only memory (EEPROM NIGHT MESSAGE) 32 by depressing "RECORD" button 14 and the "NIGHT" button 34 simultaneously. When "NIGHT" button 34 is activated this is indicated by the glow of indicating lamp 36. At this point messages have been stored in EEPROMs 26, 28 and 32 via read/write busses 38, 40, and 42 respectively. If the message is to be changed EEPROMs 26, 28, and 32 are erased via erase signals on lines 44, 46, and 48 respectively.

When the phone rings the user can pick up the receiver and ask for the identity of the caller. If the user does not wish to personally speak to the caller he may depress either "MESSAGE #1" button 14 or "MESSAGE #2 button 30. Depressing either of these buttons directs digital switch 24 to direct either EEPROM 26 or EEPROM 28 to output their contents, via digital switch 24, to digital to analog converter 50 which converts the digital signal stream into an analog of the original voice. The output of the digital to analog converter 50 is amplified by preamp 52 and is output to the telephone line 54 via mixer 56 so the message is heard by the caller.

At any time the user may depress "MONITOR" button 58 which enables preamp 52, power amplifier 60 and speaker 62 so that the telephone transaction may be monitored without the caller's awareness.

When "NIGHT" button 34 is activated and there is an incoming call ring detector 64 detects the presence of the ringing signal on telephone line 54 and directs digital switch 24 to output the message stored in EEPROM 32. At the same time digital switch 24 tells electronic ringer switch 66 to turn off the telephone's ringer so that the user is not disturbed. The message contained in EEPROM 32 might include instructions telling the caller that if his call is truly an emergency he should depress one or more touch tone keys at his location. When these keys are depressed, tone decoder 68 alerts digital switch 24 of this condition and electronic ringer switch 66 is reactivated permitting the telephone ringer to operate normally.

In FIG. 1 the invention 10 is enclosed in a case 70 that has approximately the same footprint as a conventional telephone with conventional touch tone pad 72.

In FIG. 2 the invention 12 is enclosed in a case 74 which can be made in any shape that allows it to be attached aesthetically to a conventional telephone via a double-backed adhesive or hook and loop pile type fastener material. In this embodiment of the invention the input is via a conventional modular phone jack 76 and the output is via a cable 78 and conventional modular phone plug 80.

While certain novel features of this invention have been shown and described and are pointed out in the annexed claims, it will be understood that various omissions, substitutions and changes in the forms and the details of the device illustrated and in its operation can be made by those skilled in the art without departing from the spirit of the invention.

What is claimed is:

1. An auto response phone system comprising:
   a. a digital switch that routes control and data signals throughout said auto response phone system;
   b. a multiplicity of electrically erasable programmable read only memories to store the contents of messages to be provided by said auto response phone system;
   c. a microphone to capture a user's voice message and convert said voice message into an analog signal;
   d. a microphone amplifier to increase the amplitude of said analog signal;
   e. an analog to digital converter to convert said analog signal to a stream of bits which are stored in one of said memories as directed by said digital switch;
   f. a digital to analog converter which converts said stream of bits into an analog signal which closely duplicates the output of said microphone;
   g. a preamp which increases the amplitude of the output of said digital to analog converter;
   h. a speaker and a power amplifier, whereby said speaker is driven by said power amplifier;
   i. a ring detector that outputs a signal to said digital switch whenever a ringing signal is present on a telephone line connected to said auto response phone system;
   j. an electronic ringer switch that disables the ringing signal to said auto response phone system;
   k. a mixer that allows the output signal from said preamp to connect with a telephone line connected to said auto response phone system;
   l. a multiplicity of message switches connected to said digital switch, wherein each of said message switches corresponds to one of said memories, whereby when one of said message switches is depressed said digital switch directs the appropriate memory to output its connected via said digital switch to said digital to analog converter, to said preamp, to said power amplifier, and to said speaker, and also to said mixer, thereby outputting a message onto said telephone line; and,
   m. a record switch connected to said digital switch whereby when said record switch is activated simultaneously with one of said message switches any voice incumbent upon said microphone is converted to an electrical analog signal which is amplified by said microphone amplifier, converted to a digital signal by said analog to digital converter, and directed to the appropriate memory via said digital switch, wherein said digital signal is stored in non-volatile fashion in said appropriate memory.

2. An auto response phone system, as recited in claim 1, further comprising a night switch whereby when said night switch is depressed said digital switch directs the appropriate memory to output its contents via said digital switch to said digital to analog converter, to said preamp, to said power amplifier, and to said speaker, and also to said mixer, thereby outputting a message onto said telephone line, while disabling said electronic ringer switch so that a connected phone's ringer does not operate; and a toner decoder that detects the presence of a predetermined touch tone code sequence and re-enables said electronic ringer switch such that said ringer operates normally.

3. An auto response phone system, as recited in claim 2, further comprising in signal lamp that lights when said night switch is activated.

4. An auto response phone system, as recited in claim 1, further comprising a monitor switch that when activated bridges said telephone line to said preamp so that signals transmitted via said telephone line can be automatically monitored.

5. An auto response phone system, as claimed in claim 2, further comprising a modular jack to attach a conventional modular telephone, a cable with a modular plug to connect with a conventional modular telephone line, and a case to contain all of the elements of the phone system such that the system is an accessory to a conventional modular telephone.

6. An auto response phone system for electronically answering a telephone with a selectable one of a plurality of pre-recorded messages and for screening calls by selectively blocking and remotely activating a ringer means of the telephone while also providing for the optical audio monitoring of incoming calls, said system comprising controllable logic means and switch means connected to said logic means for controlling said logic means;

ring signal detection means and a plurality of erasable message storage means connected to said logic means;

said ring signal detection means being coupled to a telephone line such that an incoming call on said telephone line is detected by said ring signal detection means and an indication is transmitted to said logic means;

message transmission means connected to said logic means and said telephone line whereby an audio message from a selected one of said plurality of erasable message storage means is selectably transmitted over said telephone line by said logic means;

means for selectively recording an audio message on any one of said plurality of erasable message storage means;

audio monitor means, ring disable/enable means, and tone decoder means;

said logic means selectively connecting said audio monitor means to said telephone line when a call has been detected by said ring signal detection means and said switch means have been switched to allow audio monitoring;

said ring disable/enable means being connected to the ringer means of said telephone and to said logic means for selectively enabling and disabling said ring means;

said tone decoder means being coupled to said telephone line and said logic means such that dialing tones on said telephone line are detected and interpreted by said tone decoder means and transmitted to said logic means;

said switch means being connected to said logic means such that switching said switch means selects one of a plurality of functions of said system, said functions including:

manually selecting an audio message from one of said plurality of storage means for immediate transmission over said telephone line, selecting a message from one of said plurality of storage means for automatic transmission over said telephone line when a ring is detected by said ring signal detection means, disabling said ringer means and selecting a message from one of said plurality of storage means for automatic transmission over said telephone line when a ring signal is detected by said ring signal detection means and automatically enabling said ringer means when said tone decoder detects a preselected tone or sequence of tones on said telephone line, and selecting a message from one of said plurality of storage means for automatic transmission over said telephone line when a ring is detected by said ring signal detection means and enabling said audio monitor means to monitor transmission on said telephone line.

7. An auto response phone system as claimed in claim 6 wherein said message storage means comprise erasable programmable read only memory modules.

8. An auto response phone system as claimed in claim 7 wherein said message transmission means comprises a digital to analog converter.

9. An auto response phone system as claimed in claim 8 wherein said means for selectively recording comprises a microphone and an analog to digital converter.

10. An auto response phone system as claimed in claim 9 wherein said audio monitor means comprises a loudspeaker and an amplifier.

11. An auto response phone system as claimed in claim 10 wherein said logic means comprises an integrated circuit chip.

12. An auto response phone system as claimed in claim 11 wherein said logic means comprises a plurality of gate means.

13. An auto response phone system as claimed in claim 12 wherein said switch means comprises a plurality of push buttons.

* * * * *